April 23, 1929.   H. J. ASLESON   1,710,081
TRUSS
Filed Feb. 27, 1928
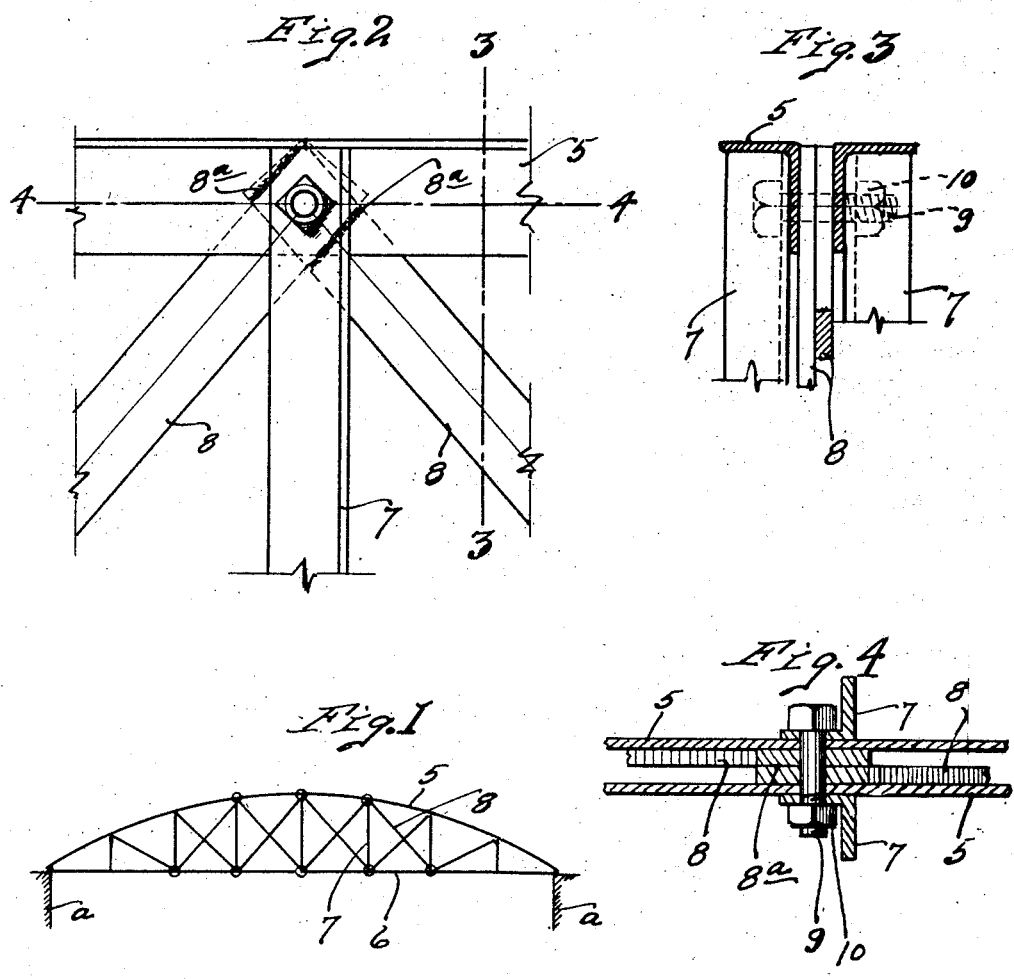
Inventor
Hans J. Asleson
By his Attorneys
Merchant + Kilore Patented Apr. 23, 1929.

1,710,081

UNITED STATES PATENT OFFICE.

HANS J. ASLESON, OF MINNEAPOLIS, MINNESOTA.

TRUSS.

Application filed February 27, 1928. Serial No. 257,204.

My invention relates to structural steel trusses, such as girders, roof-supporting rafters, bridge spans and the like, and provides a highly important feature whereby the efficiency of the truss is materially increased.

The invention is illustrated in the accompanying drawings, wherein like characters indicate like parts throughout the several views.

Referring to the drawing:

Fig. 1 is a diagrammatic side elevation showing the truss designed as a single span;

Fig. 2 is a fragmentary side elevation of a portion of the truss;

Fig. 3 is a view partly in vertical section on the line 3—3 of Fig. 2, but with some parts in full; and Fig. 4 is a horizontal section taken on the line 4—4 of Fig. 2.

In the truss illustrated, the arched top compression member 5 is formed by two angle bars having their depending flanges spaced in parallel relation. The bottom tension member 6 may be assumed to be made, in a similar manner, of straight angle bars having spaced parallel vertical flanges. The struts 7, in this illustrated truss, are made up of pairs of straight vertically disposed angle irons having their parallel flanges placed against the vertical flanges of the members 5 and 6. The oblique members 8 are flat bars, certain of which are placed in obliquely crossed arrangement and with their joining ends overlapped and with a bolt 9 passed through coincident bolt holes formed in the members 5, 6, 7 and 8. The bolts 9 are shown as provided with nuts 10. The trussed structure so far described would be ordinary truss structure, except that interior gusset plates would be required.

As the salient feature of this invention, the contacting lapped ends of the oblique members 8 are electrically welded together or rigidly and substantially integrally united, as best shown at 8ᵃ in Figs. 2 and 4. The importance of this feature will be appreciated when it is fully considered that, in the customary arrangement, wherein the members 8 are simply loosely lapped together, each bolt 9 is subjected not only to shearing strain at three points, but also to a bending strain in the plane of the contacting surfaces of the overlapped ends of said members 8, and which plane is midway between the opposing faces of the vertical flanges of the members 5—5 and 6—6. Obviously, with the overlapped ends of the members 8 welded together so that the one member 8 cannot slip in respect to the other, the two overlapped and integrally united ends act as a single member, thereby entirely eliminating bending stress at the center of the bolt and converting the load-resisting force entirely into shearing strain directly between the outer faces of the members 8 and the inner faces of the vertical flanges of said members 5—5 and 6—6. Stated in another way, the bearing value of the pin is increased from the bearing value on the thickness of the one bar to the bearing value on the combined thickness of the two bars that are welded together, and which is greater than the double shear on the pin. By thus making the limiting value of the connection the value of the pin in double shear, the necessity for interior gusset plates is eliminated by the substitution of a one-bolt connection. This accomplishes a saving, both in shop labor and in metal, to such an extent that the average structural steel truss may compare favorably in price with a wooden truss. The values of the steel trusses over wooden trusses, by way of durability, reduced fire hazard and general appearance, are well known.

While I have, in the drawing, illustrated a specific form of truss, it is, of course, obvious that the invention herein disclosed is capable of incorporation to a greater or less extent in various different designs and forms of trusses, all within the scope of the invention as herein disclosed and claimed.

What I claim is:

1. In a truss, a main truss member comprising laterally spaced bars, oblique truss members having overlapping and integrally united ends increasing the thickness of the lapped portion to that of the aggregate width of the two lapped members interposed between the spaced bars of said main truss member, and a bolt passed through the spaced bars of said main member and through the integrally united ends of said lapped members.

2. In a truss, the combination with main truss members comprising laterally spaced bars, struts comprising laterally spaced bars seated against the bars of said main members, oblique truss members having overlapped and integrally united ends increasing the thickness of the lapped portion to that of the aggregate width of the two lapped members interposed between the spaced bars of said main truss member, and a bolt passed through the spaced bars of said main and end strut members and through the integrally united ends of said lapped members.

In testimony whereof I affix my signature.

HANS J. ASLESON.